United States Patent
Buttersack et al.

(10) Patent No.: US 6,860,233 B2
(45) Date of Patent: Mar. 1, 2005

(54) LITTER FOR CATS AND SMALL ANIMALS

(75) Inventors: Christoph Buttersack, Braunschweig (DE); Dieter Wullbrandt, Denkte (DE)

(73) Assignee: Institut fur Technologie der Kohlenhydrate- Zuckerinstitut - e.V. (DE)

(*) Notice: Subject to any disclaimer, the term of this patent is extended or adjusted under 35 U.S.C. 154(b) by 0 days.

(21) Appl. No.: 10/451,462

(22) PCT Filed: Dec. 21, 2001

(86) PCT No.: PCT/EP01/15278
§ 371 (c)(1),
(2), (4) Date: Jan. 12, 2004

(87) PCT Pub. No.: WO02/054874
PCT Pub. Date: Jul. 18, 2002

(65) Prior Publication Data
US 2004/0112298 A1 Jun. 17, 2004

(30) Foreign Application Priority Data

Dec. 21, 2000 (DE) .......................... 100 64 347
Feb. 3, 2001 (DE) .......................... 101 05 318

(51) Int. Cl.$^7$ .............................................. A01K 29/00
(52) U.S. Cl. ....................................................... 119/171
(58) Field of Search ................................ 119/171, 172, 119/173

(56) References Cited

U.S. PATENT DOCUMENTS

| | | | |
|---|---|---|---|
| 4,386,580 A | 6/1983 | Johnson | |
| 4,883,021 A | 11/1989 | Ducharme et al. | |
| 5,183,010 A | 2/1993 | Raymond et al. | |
| 5,230,305 A | 7/1993 | House | |
| 5,605,114 A | 2/1997 | Peltenburg et al. | |
| 5,901,661 A | * 5/1999 | Pattengill et al. | 119/173 |
| 5,970,916 A | * 10/1999 | Yoder et al. | 119/173 |
| 6,089,189 A | * 7/2000 | Goss et al. | 119/173 |
| 6,089,190 A | * 7/2000 | Jaffee et al. | 119/173 |
| 6,745,720 B2 | * 6/2004 | Rasner et al. | 119/172 |
| 2003/0205204 A1 | * 11/2003 | Wang et al. | 119/171 |

FOREIGN PATENT DOCUMENTS

| | | |
|---|---|---|
| DE | 37 07 473 | 9/1988 |
| DE | 41 01 243 | 7/1992 |
| DE | 195 43 311 | 10/1997 |
| EP | 0 298 143 | 1/1989 |
| EP | 0 676 135 | 4/1995 |
| WO | WO91/05464 | 5/1991 |
| WO | WO96/34523 | 11/1996 |

OTHER PUBLICATIONS

Buttersack, Christoph; "Fundamentals of the Mechanical De-watering of Sugar Beet Pulp", Zuckerind, 119 (1994) Nr. 10, S. pp. 831–846.

Mohr, H. and Schopferr, P.; "Lehrbuch der Pflanzenphysiologie", Manuel of Plant Physiology, 3rd edition 1978, pp. 47–40.

* cited by examiner

*Primary Examiner*—Yvonne R. Abbott
(74) *Attorney, Agent, or Firm*—Salter & Michaelson

(57) ABSTRACT

Litter for cats and small animals often consists of a mixture from dried material of plant origin and an adjuvant that promotes agglomeration when the mixture is exposed to moisture. The invention relates to a novel litter that is characterized in that the dried material of plant origin is present in a particle size range in which the diameters of 80% of the particles, based on the mass, range from more than 0 μm to less than 1000 μm. The mass sum distribution of the particle size distribution, at least in the range between 50 μm and 1000 μm, is larger than an integrated statistical Gaussian distribution at which the Gaussian distribution is a normal Gaussian distribution with an average value of 100 μm and a standard deviation of 800 μm and at which the particle size distribution deviates by more than 10% from this statistic Gaussian distribution.

33 Claims, 3 Drawing Sheets

LITTER FOR CATS AND SMALL ANIMALS

The invention relates to a litter for cats and small animals, composed of a mixture of dried material of plant origin and an auxiliary agent promoting clumping of the mixture upon the addition of moisture. It also relates to a process for the production of such a litter.

Litter for cats and small animals, also referred to as animal litter, is primarily intended for household pets. The litter is spread out and used as bedding for the animal. Over the course of time, the litter is wetted by the animal with body fluids, in particular locally with urine. The general requirement is that litter thus wetted with urine as far as possible absorbs all the moisture from the animal in order to prevent fouling of the environment, as well as enabling the person caring for the animal to dispose of all the litter, or possibly only the constituents of the litter consumed in this manner, as easily as possible.

In view of the increasing number of household pets, many suggestions for improving such litter for cats and small animals have been made in recent years. The most widely used products in this case are those based on inorganic mineral materials, in particular bentonite. This material is capable of forming capillaries, has a relatively large inside surface and thus a high binding power. The disadvantage is that bentonite is not biologically degradable or capable of being composted, nor is it composed of renewable raw materials.

Therefore, ecologically fully recyclable products are preferred.

In DE 195 43 311 C1 a granulate made of wood particles is proposed for this, e.g. of crushed wood shavings such as those produced as waste product in wood processing, which are thus inexpensive to obtain in an environmentally friendly manner. A comparable proposal is made in DE 37 07 473 C2, according to which waste from paper production, e.g. paper pulp or ground wood pulp, is used as starting material, plant fibres being proposed as an alternative.

The disadvantage with such products with a high fibre content is that these particles are relatively difficult to deform. For example, wood shavings are not incompressible, but they are not easily deformed, and in particular have an unsatisfactory plastic deformability, while their elastic deformability is still satisfactory. Stiffening, also referred to by the term "lignification", occurs in plant fibres, in particular cell bonds of the wood, as a result of formation of secondary walls.

Therefore, a material of plant origin, which contains no fibres or has as low a fibre content as possible, would be substantially more suitable. For example, the use of pulped, expressed and subsequently dried sugar beet cossettes was proposed in EP 0 676 135 A1. U.S. Pat. No. 5,605,114 also relates to the same material. Alternatively, the use of citrus pellets or pulped chicory roots is also considered, as already indicated in U.S. Pat. No. 4,388,580 or U.S. Pat. No. 5,605,114.

The use of such a dried material of plant origin alone indeed results in a usable litter for cats and small animals, which also has a high water absorbency. The formation of clumps in addition, however, is highly desirable for subsequent disposal, since they can be removed in a user-friendly manner. These user-friendly clumps are not formed by using the mentioned material of plant origin. It has been found that the addition of auxiliary agents, which promote clumping of the mixture upon the addition of moisture, is expedient for this. As a result of the promoting auxiliary agent, a clump that is more easily removed later is formed at the corresponding locations at which the litter is locally wetted with urine by the animal.

Clumping can be achieved by the material, which absorbs the water or urine, forming a gel. A gel is a dimensionally stable, readily deformable material, which has a thickening agent, e.g. gelatine, and also a liquid, i.e. water or urine in this case, as dispersing agent. Consequently, the gel is formed only as a result of the addition of liquid. This effect is used, for example, in U.S. Pat. No. 5,183,010 for an animal litter as a result of the addition of polymers with hydroxyl groups to a bentonite-based product. In EP 0 298 143 A1 an acrylic acid copolymer is also added to inert porous substrate particles in an amount sufficient to agglomerate the urine and with the particles form a gel, which is sufficiently mechanically stable to be removed as a whole from the container with the animal litter.

In the already mentioned DE 195 43 311 C1 guar meal, which is a polysaccharide consisting of galactose and mannose, namely a galacto-mannan, is used as auxiliary agent for clumping. On the addition of borax a gel is formed there, which is capable of encasing the further larger absorbent particles, i.e. sawmill shavings, with a diameter of 0.5 to 5 mm.

A problem is that compacted particles composed of sawmill shavings have the tendency to collapse again on the absorption of water and with the associated increase in volume. There is the risk that they do not survive swelling as an entity. In order to prevent this, the content of gel-forming auxiliary agent, namely guar meal, must be relatively high; typical contents are between 13% and 38%, wherein the disadvantage is also that guar meal is the most costly component of the total mixture.

It would be desirable to have a clumping litter for cats and small animals, which is formed with as few expensive auxiliary agents as possible and which has the favourable readily deformable and at the same time water-absorbing properties of sugar beet particles. Hitherto, in all known proposals sugar beet cossettes have been used as cat litter only for non-clumping litter products and only in the form generated during sugar production, namely as flat curved particles with dimensions of about 1 cm to 3 cm. Where necessary, the particles were subsequently brought into a suitable form similar to the usual litter by pelleting and subsequent crushing, as in EP 0 676 135 A1, for instance, or they were crushed to a size of between 0.3 mm and 1.0 mm as proposed in U.S. Pat. No. 4,386,580. The use of plant fibres, including sugar beet, is described in DE 37 07 473 C2. The starting material is crushed to a size of between 1 mm and 10 mm in order to produce a cat litter by granulation.

Therefore, the object of the invention is to propose such a litter for cats and small animals, which takes into consideration the aforementioned requirements.

This object is achieved in that the dried material of plant origin is present in a particle size range, in which the diameters of 80% of the particles by mass amount to between more than 0 $\mu$m and less than 1000 $\mu$m, in which the mass cumulative distribution of the particle size distribution is at least in the range of between 50 $\mu$m and 1000 $\mu$m greater than an integrated statistical Gaussian distribution, in which the Gaussian distribution is a Gaussian normal distribution with a mean of 100 $\mu$m and a standard deviation of 800 $\mu$m, and in which the particle size distribution deviates from this statistical Gaussian distribution by more than 10%.

It is preferred if the upper limit lies at 1000 $\mu$m, in particular at 600 $\mu$m and even only at 400 $\mu$m.

The laser diffraction method with a measurement range of at least 8 μm to 1600 μm is particularly suitable as basis for determination of the respective particle size distribution of the dry material.

Therefore, according to the invention the mass cumulative distribution of the starting material does not follow a function resulting from a Gaussian normal distribution, but a positively curved function with only one inflection point before the maximum particle size. Thus, the first derivation of this function is also positive up to this inflection point.

It must, of course, be taken into consideration in this case that the measured real curve can deviate from the ideal curve. This should still be possible within the scope of a standard deviation of 30%.

Surprisingly, the set problem can be resolved with such a defined size distribution. Contrary to all the known proposals, consideration is now not only given to the material, or as in some cases to the particle size of the material, but for the first time also to the distribution of the particle sizes over a range with different diameters. Better properties of a specific distribution clearly deviating from the usual have actually been shown in tests.

In the known recipes for the production of clump-forming litter, only a size range, namely a lower and an upper limit, is specified for the water-absorbent base material.

Thus, DE 195 43 311 C1, for example, proposes sawmill shavings with a size in the range of between 0.5 mm and 5 mm, i.e. 500 μm to 5000 μm. It initially appears obvious that relatively large and therefore fewer particles improve the cohesion of the pellets composed from the particles and also the clumps formed, and these are therefore advantageous. However, many more auxiliary agents are then also necessary for clumping.

For crushing sugar beet cossettes, a size of between 0.3 mm and 1.0 mm is proposed in U.S. Pat. No. 4,386,580, for example, and between 1 mm and 10 mm in DE 37 07 473 C2.

DE 41 01 243 A1 in turn describes an animal litter composed of cellulose products, e.g. sawdust, and a weighting agent, preferably of inorganic fillers, and a thickener or binding agent, wherein the particle size range lies below 1000 μm, preferably below 500 μm, e.g. between 100 μm and 300 μm.

A clump-forming litter, which is composed of a liquid-absorbing material (clay mineral, paper, wood or sawmill shavings, organic fibres etc.), a water-soluble polymer and an "accelerant" (borate), which agglomerates to form clumps on contact with water, is described in U.S. Pat. No. 5,183,010. In this case, the preferred size of the water-absorbing particles should lie between 70 μm and 3000 μm.

A clump-forming cat litter based on natural products, preferably flour, in which 75% of the particles should lie between 250 μm and 2500 μm, is described in U.S. Pat. No. 5,230,305 and WO 96/34323. The remaining 25% of the particles can therefore lie below 250 μm as well as above 2500 μm.

It has now been found according to the invention that a substantially improved clumping tendency occurs if the particles of plant origin have very different sizes from one another. As a physical explanation it is to be assumed that the particles of many different sizes result in spatially denser packing. Interstices between particles of the same size, as in a purely statistical distribution curve, result in many spaces, which reduce contact between the particles and also do not promote the simultaneously desired clumping. With different particle sizes of the respective particles, the interstices are then filled by correspondingly smaller particles.

Therefore, as a result of the invention a litter is produced, in which the compacted particles are structured internally such that they do not fall apart upon the absorption of water and with the associated increase in volume, but as compacted particles survive swelling as an entity. Moreover, the particles will adhere to one another to form clumps and also remain in clump form.

It is particularly favourable if sugar beet cossettes and/or pulped chicory roots and/or citrus pellets are used as material of plant origin.

Sugar beet cossettes are particularly preferred since these are available in large quantities at very favourable cost and at the same time have optimum properties for animal litter. However, it is possible, and useful for obtaining specific odour properties or odour absorption of the animal litter, to additionally use a citrus pellet or also to use these exclusively. It is also conceivable to use admixtures of other materials of plant origin.

As regards obtaining an odour of the sugar beet cossettes perceived as pleasant before use, sensory tests have revealed that admixtures of porous inorganic substances can have a positive effect. However, the proportion of these substances should be below 20% in total so as not to impair the clumping properties. The use of a natural zeolite of the clinoptilolite type alone or in combination with a clay material has already been described in WO 91/05464 with respect to binding the odour from animal excreta and urine. However, the tests conducted here have shown that the zeolite is also able to reduce the typical inherent odour of sugar beet cossettes.

Surprisingly, the clay mineral bentonite already used as such as cat litter also causes a reduction in the typical inherent odour of the tissue of sugar beet cossettes. The tests have shown that in particular bentonites with a high proportion of montmorillonite are suitable for this. The best results are obtained if the montmorillonite is present in the form exchanged with aliphatic amines or with alkali ions, in particular in $Na^+$ form or in $H^+$ form. Diatomaceous earth may also be used. An activated bentonite with a surface of more than 100 $m^2/g$ is particularly suitable.

However, it is also advantageous if cyclodextrin, in particular β-cyclodextrin, and/or salts of transition metal ions and/or aluminium salts are used as odour-reducing additions. Cyclodextrins are used in sprays to neutralise odours. A reduction in the inherent odour in cat litter also by adding cyclodextrin has likewise been mentioned only with respect to binding the odour from animal excreta and urine, e.g. in U.S. Pat. No. 4,883,021.

The zinc salt of ricinoleic acid has proved advantageous in sprays for neutralising odour molecules in particular containing nitrogen and sulphur, cf. R. Zekorn, Cosmetics & Toiletries Magazin 112 (1997), pages 37 to 40. Small quantities of added salts of transition metal ions such as zinc, nickel and iron salts reduced the inherent odour in sensory tests. It should be assumed that in accordance with the exchange capability of the carboxyl groups contained in the pectin of sugar beet cossettes of about 1 meq/g with the equilibrium moisture content in dry state (upon wetting at the latest) the metal ions—if they do not exceed the concentration specified above—will already be bound to the skeletal substance of the sugar beet cossettes (cf. Vincent M. Dronnet et al., Industries Alimentaires & Agricoles [Food and Agricultural Industries], 116 (1999), pages 29 to 35). An odour-reducing effect was also observed after the addition of aluminium salts.

As a result of the subsequent compaction of the mixtures, the added substances are also integrated so that separation or deposition of these substances is not to be expected.

The resulting product, i.e. the animal litter, is of organic origin and biologically degradable and may also be composted. All requirements of purchasers for an ecologically fully recyclable product will thus be met.

Surprisingly, substantially fewer auxiliary agents are required than expected to reach a specific intensity of clump formation, and this is specified, for example, in DE 195 43 311 C1 as 13% to 38% guar meal. The auxiliary agents promoting clumping may be obtained at a generally less favourable price than the porous base material, e.g. the sugar beet cossettes. Therefore savings in quantity or degree of intensity of such auxiliary agents are extremely advantageous.

Sugar beet particles are very readily deformable, the plastic deformability being clearly superior compared to the elastic deformability, particularly when the material has already absorbed water or other liquid. The more favourable mechanical properties of sugar beet cossettes compared to moist wood shavings have already been proved in a different context by pressing tests: see Christoph Buttersack, Grundlage der mechanischen Entwässerung von Zuckerrübenschnitzeln [Basis for mechanical dehydration of sugar beet cossettes], in Zuckerindustrie 119 (1994), No. 10, pages 831 to 846, in particular page 835. Sugar beet tissue is predominantly composed of young, indeterminate, so-called parenchymatous cells, whereas the cell bonds of conventionally used sawmill shavings, i.e. wood, are stiffened, cf. H. Mohr, P. Schopfer, "Lehrbuch der Pflanzenphysiologie" [Manual of Plant Physiology], 3rd edition 1978, pages 37 to 40.

However, sugar beet cossettes still have a high water-absorption capacity and an odour-absorbing property, but their properties are clearly improved by the novel and unusual particle size distribution.

Dried unmolassed sugar beet cossettes form the basis for the production of the litter according to the invention. These extracted sugar beet cossettes and possibly added pulped chicory roots and/or citrus pellets and/or other, in particular non-lignified plant residues, are ground in a suitable mill, in particular a hammer mill. The particles initially formed with a specific maximum particle size are drawn off by sieves and returned to the grinding process. For this, a sieve with a mesh size of 200 $\mu$m to 1000 $\mu$m, preferably 500 $\mu$m to 900 $\mu$m, is selected. The mill is adjusted so that a broad particle size range results, in which the proportion by mass of the particles below 100 $\mu$m amounts to more than two thirds of the proportion by mass of the particles between 100 $\mu$m and 400 $\mu$m and the corresponding mass cumulative distribution rises monotonically where possible and has only one inflection point before the particle size upper limit.

The result of these measures is that the dried material of plant origin is present in a particle size range, in which the diameters of 80% of the particles by mass amount to between more than 0 $\mu$m and less than 1000 $\mu$m, in which the mass cumulative distribution of the particle size distribution is at least in the range of between 50 $\mu$m and 1000 $\mu$m greater than an integrated statistical Gaussian distribution, in which the Gaussian distribution is a Gaussian normal distribution with a mean of 100 $\mu$m and a standard deviation of 800 $\mu$m, and in which the particle size distribution deviates from this statistical Gaussian distribution by more than 10%.

The basic type of particle size distribution is already influenced by the type of mill used. Cutting mills such as a cylinder mill, for example, ideally lead to fragmentation of the starting material, from which an approximately statistical distribution is more likely to result, whereas a hammer mill fundamentally provides a much broader distribution.

Naturally, a broader particle size distribution can also be achieved by suitable separation stages usual in flour processing, namely additional sieving or air classifying, and further returns of the coarse fraction to the mill. As part of these provisions grinding is set so that the clumping of the end product generated from this mixture is as substantial as possible.

The presence of individual particles with a diameter of more than 1000 $\mu$m has been found to be relatively uncritical. They do not impair the positive effect of the particle size distribution according to the invention, but are less favourable with respect to the moisture absorption by mass. Therefore, they are less desirable, should not be more than 20%, where possible less than 10%, of the mass, but their complete removal by sieving or sorting is generally not economical.

The polydisperse ground material is mixed with an auxiliary agent promoting clumping, for which a water-soluble polymer in powder form in particular is used. Further additions, also in powder form, may also be added to neutralise the odour of the beet. This unchanged dry mixture material is now compacted, e.g. tabletted in dry state, pelleted, extruded or expanded with the addition of water and steam. The moisture of the product thus generated is then possibly reduced by cooling and drying to the equilibrium moisture content. The product can then be mechanically crushed. The size of the particles formed during this crushing process can also be optimised. This size should not be confused with that of the originally used particles of plant origin. For practical use as litter, particles of a size of about 500 $\mu$m to 2000 $\mu$m, i.e. 0.5 mm to 2 mm, are favourable. Smaller particles act like dust, and are therefore undesirable and are sieved off. Larger particles do not promote the tendency to form clumps and are crushed further.

In an alternative production process the dry initial mixture is not compacted and mechanically crushed, but wetted in a mixing machine and the viscous mass granulated. This can be achieved by pelletising with a rotating pan granulator or a rotary drum granulator, or a wet granulation is conducted by pressing the viscous mixture through a sieve. In this way, particles of the desired size can also be produced without subsequent mechanical crushing. The larger quantity of water compared with compacting is a disadvantage. This must ultimately be removed by a drying process.

The finished litter produced by the above-described methods is ready for sale.

The user uses it as animal litter. For this, as usual, the product is poured into a shallow plastic tray to about 4 to 6 cm high. The product forms clumps on local addition of water or urine or other liquid. The clumps formed can be removed after a waiting time of a few minutes with a mesh scoop usual among cat accessories, for example, without it falling apart.

As may be confirmed by tests, extracted dry sugar beet cossettes have a maximum water absorbency of 4.5 g per gram of sugar beet cossettes. As a result of the grinding to the said particle sizes, the proportion of surface-bonded water increases and values of more than 7 g water absorbency per gram of sugar beet cossettes are reached. In contrast, usual commercially available sorts of mineral-based, e.g. bentonite-based, cat litter have only a maximum water absorbency of about 2.0 g per gram of litter.

The clumps formed in the spread litter according to the invention after local wetting have a water content which is clearly higher than that of conventional bentonite cat litter. In this case, the relative mechanical stability of a clump with a water content of 3 g per gram of litter, for example, is as high as that of a conventional bentonite cat litter with a content of only 1.5 g per gram of cat litter.

Particularly advantageous is the good mechanical stability, which the individual litter particles with the particle size distribution according to the invention have in particular in wetted state. If the mechanical stability were unsatisfactory, not only would the clumping effect not occur, but the simple removal would be additionally problematic.

Ultimately, therefore, there are two different "strengths", which have to be considered for a usable litter: on the one hand, the strength of the particle in itself, i.e. its stability, and on the other hand the strength of the clump, which has formed after several particles have clumped together.

As tests (see below) very quickly reveal, although ground sugar beet cossettes without the addition of auxiliary agents to promote clumping are relatively stable in themselves and have a good firmness, any clumps that form do not withstand any mechanical stress.

The use as auxiliary agents of polymers distinguished by having a viscosity of more than 50 mPa on production of a 2.5% aqueous solution is particularly preferred.

Cellulose derivatives, galacto-mannan, starch, polyethylene oxide, polyacrylic acid, polyacrylamide or also copolymers composed of acrylic acid and acrylamide, amongst others, have proved usable. Advantageously, some mixtures of these substances may also be used. Suitable cellulose derivatives in particular include carboxymethyl cellulose, methyl cellulose, hydroxyethylmethyl cellulose or hydroxypropylmethyl cellulose. However, a cellulose derivative should only be used in a maximum proportion of 10%.

A particularly suitable galacto-mannan is guar meal. This should also only be used in a maximum proportion of 5%.

If starch is used, then starch soluble in cold water is to be preferred. In this case, potato starch, tapioca starch or corn starch is particularly suitable for use. Starch should be used in a maximum concentration of 20%. Starch derivatives such as carboxymethyl starch, for example, have also proved suitable.

Besides polyacrylic acid or copolymers of acrylic acid, their soluble salts may also be used.

Where not expressly specified otherwise, the % data should be respectively understood to be percentage by weight or percentage by mass.

In processes for the production of litter according to the invention, the two above-mentioned alternatives have proved particularly suitable. Therefore, it is preferred if dried material of plant origin is crushed in a mill and subsequently sieved, that the coarse fraction formed is returned to the grinding process again, that an auxiliary agent promoting clumping of the mixture on the addition of moisture is added, and that the resulting mixture is compacted and mechanically crushed.

Alternatively, a process is distinguished in that dried material of plant origin is crushed in a mill and subsequently sieved, that the coarse fraction formed is returned to the grinding process again, that an auxiliary agent promoting clumping of the mixture on the addition of moisture is added, and that the resulting mixture is wetted in a mixing machine, is agglomerated to the desired size therein and is then dried to the equilibrium moisture content.

The term compacting here can be understood, for example, to mean extruding, expanding, pelleting or tabletting.

A particularly water-saving process results if the operation proceeds with a tabletting process.

For regular examination of the product quality during production, it is preferred if samples of the dried material of plant origin are removed continuously or in batches prior to the addition of the auxiliary agent promoting clumping and their particle size distribution determined, preferably using the laser diffraction method. The model HELOS of SYMPATEC System-Partikel-Technik in Clausthal-Zellerfeld, Germany, for example, has proved advantageous in tests in this case.

A more detailed explanation of specific aspects of the invention is given below on the basis of some practical examples and test descriptions:

Figure 4:
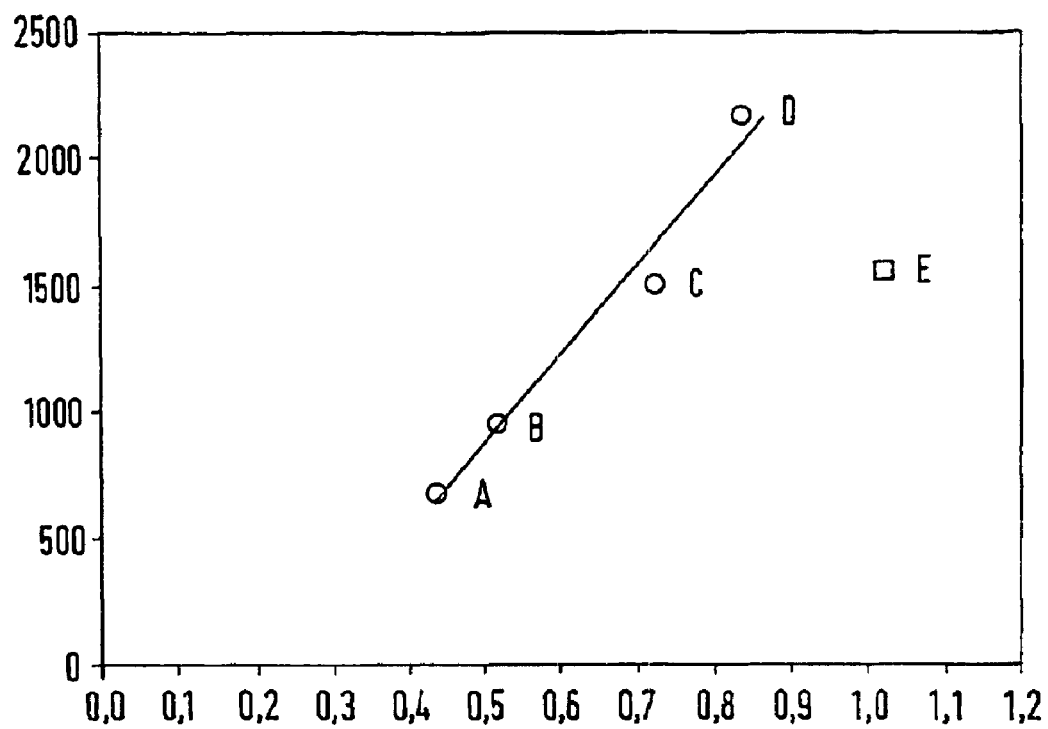
Figure 5:
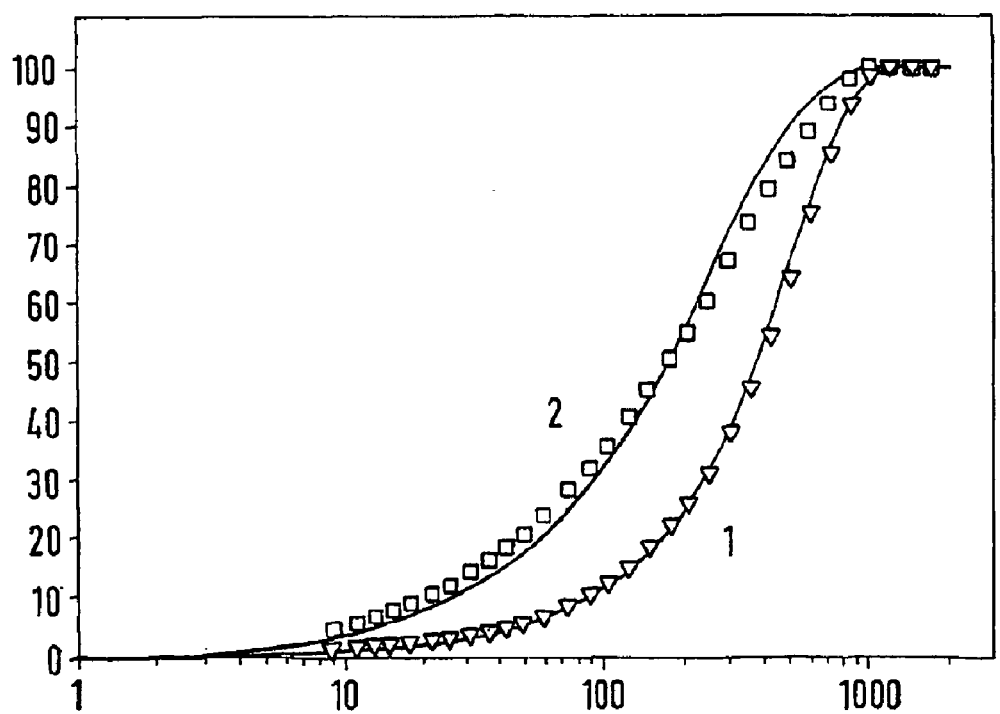

FIG. 4 shows the breaking strength of the gel measured with the pectinometer as a function of the ratio of the particle mass below 100 $\mu$m ($F_{100}$) to the particle mass between 100 $\mu$m and 400 $\mu$m ($F_{400-100}$); and FIG. 5 shows an assimilation of two different particle size distributions of ground, dried, unmolassed sugar beet cossettes to a Gaussian function (solid curve represents the calculated function).

As mentioned above, ultimately there are, therefore, two different "strengths", which would have to be considered for a usable litter: on the one hand, the strength of the particle in itself, i.e. its stability, and on the other hand the strength of the clump, which has formed after several particles have clumped together.

Figure 1:
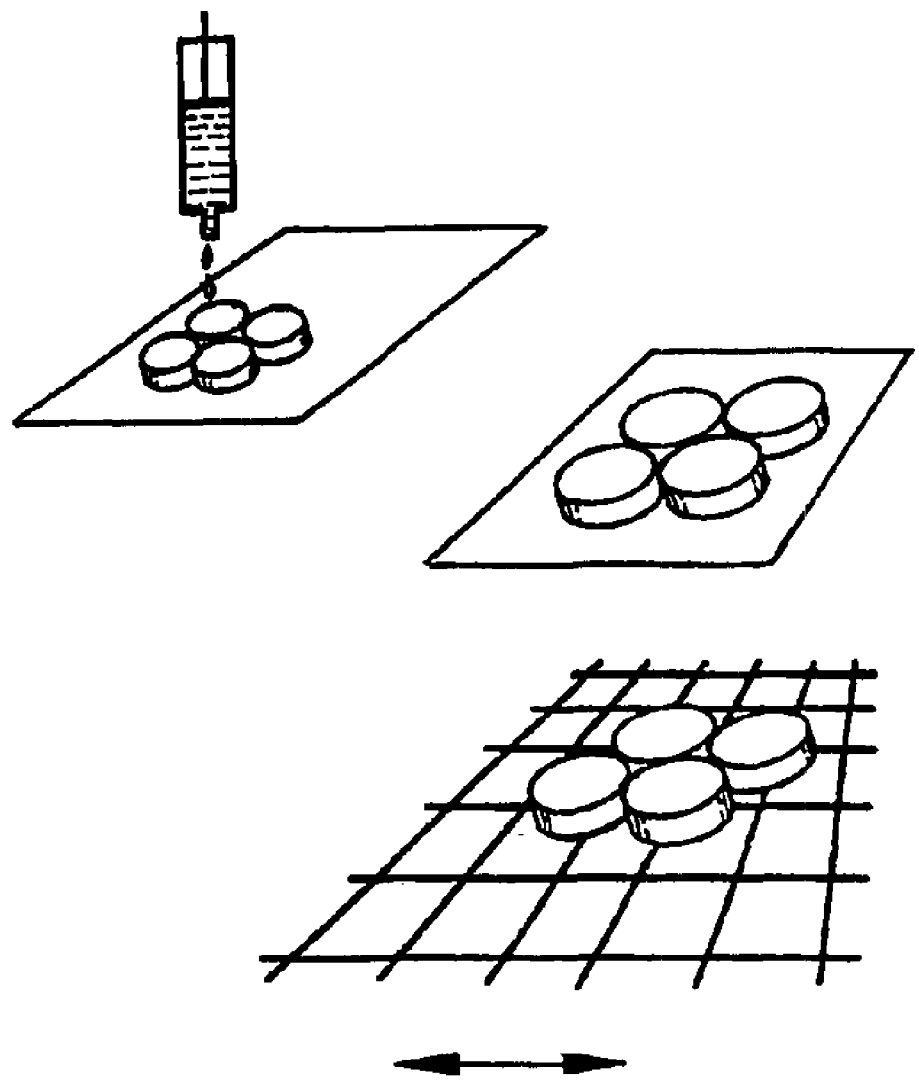
FIG. 1 is a schematic representation of a test for clumping and wet abrasion.

Various tests for the two strength values were conducted. FIG. 1 graphically shows the curve of one test. In this, the compacted particles (prior to mechanical crushing, 3 mm in diameter and larger) were-wetted with a standard amount of moisture: generally three times the amount of water in relation to the particle mass in the tests. The particles then absorb the water and hold together relatively well, thus forming clumps. After a short waiting period according to practice of two minutes the expanded particles can then be shifted onto a horizontally arranged wire mesh sieve. In this case, the mesh size is selected to be 1 mm larger than the diameter of the dry compacted particles so that the dry particles would fall through. This wire mesh sieve is than moved in a circular motion at 350 revolutions per minute, for example, for 5 minutes.

After this, counting and weighing can then be conducted to determine what proportion of expanded particles originally located on the sieve is still located there subsequently. This proportion is then the strength of the individual particle. On the other hand, it may also be determined whether the initially present clumps are still present after mechanical stresses and in what form. If the clump has collapsed into its original individual parts, this strength of the clump would equal zero.

As the tests very quickly reveal, while ground sugar beet cossettes without the addition of auxiliary agents for promoting clumping are relatively stable in themselves and have a good strength, any clumps formed do not survive any mechanical stress.

However, if such auxiliary agents are used and in turn ground sugar beet cossettes are used, then the advantageous properties according to the invention are confirmed. Optimum results were achieved with shaped parts composed of ground sugar beet cossettes with an addition of 6% polyvinyl pyrrolidone (Kollidon 90 F, BASF) after a water absorption of 3 g per gram of litter when the particle size upper limit lay at 500 μm. 81% of the original particles remained stable, also 81% of the particles remained together in clump form.

Surprisingly, a comparison of different possible auxiliary agents showed that strongly cohesive, but low-molecular substances such as dextrin, for example, indeed resulted in a low strength of the clumps than auxiliary agents with a high molecular weight and a high viscosity. The necessary amount of auxiliary agent generally lay below 10%.

Figure 2:
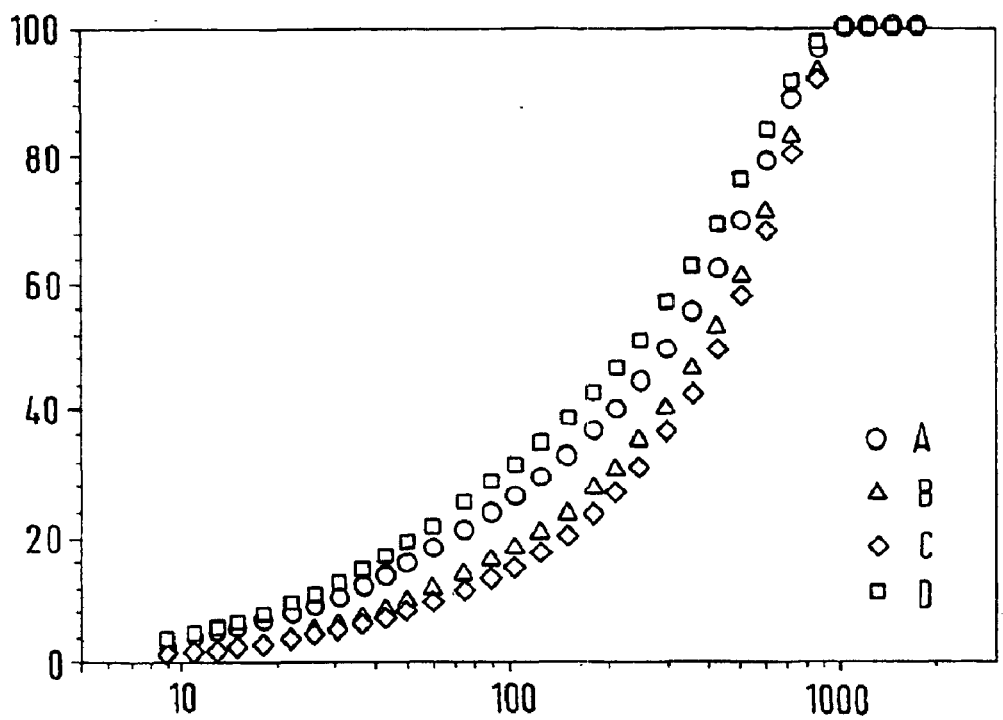
FIG. 2 shows a mass cumulative distribution of four differently ground pellets of dried unmolassed sugar beet cossettes.

By way of example, FIG. 2 shows some distributions A, B, C and D, which were determined as measurement results in tests and were the basis for a litter product. To the right the particle size is entered logarithmically as diameter in μm, and the mass cumulative distribution $Q_3$ in per cent (%) directed upwards.

In order to measure the effect of the particle size distribution claimed in particular in this application on the mechanical stability of the clumps formed from the individual compacted or granulated particles with water, the breaking strength of the gel was measured using a method such as is usual, for example, to determine the breaking strength of pectin gel, in particular in preserves.

The "Pectinometer" Mark II of HERBSTREITH & FOX is used. The test beaker with a diameter of 7.0 cm and a height of 5.5 cm and the freely erected insert located centrally therein is filled with 40 ml of cat litter and its mass determined by weighing.

Three times the amount of water—uniformly distributed on the surface of the sample—is pipetted thereto and the insert pressed downwards so that it holds its position on the base of the beaker. The resulting clump advances onto the grooved wall of the test beaker so that it is fixed on the test beaker. After a swelling time of 20 mins. the protruding hook of the insert is hooked onto the hook of the thread coupled to the force-path sensor and measurement is started by pulling up the thread at 1 cm/s by the mechanism of the measurement device. In accordance with firmly set parameters, the device now measures the force (in pond) which is necessary to pull the insert out of the (simulated) clump fixed in the test beaker. This measurement is performed six times in total. These numerical values thus obtained correlate with the strength of the clumps formed by local wetting of the finished spread litter, as perceived subjectively by compressing said clump manually.

In order to determine the effect of the particle size distribution, a batch of dried unmolassed sugar beet cossettes is ground in a hammer mill with different settings, so that the mass cumulative distributions shown in FIG. 2 resulted. The respective ground material was mixed with 1% carboxymethyl cellulose (type WALOCEL CRT 30000 P, WOLFF CELLULOSICS GmbH and then conditioned with 12 parts water and 2.5 parts steam to 100 parts ground material and compacted in a dual-shaft extruder with a specific energy input of 80 to 100 kWh/kg, a head temperature of 215° C. and a final pressure of 85 to 90 bar (corresponding to 8500 to 9000 kPa).

The curves A, B, C and D shown in FIG. 2, like all integrated curves, have a monotonically rising progression. It can be seen that they reach the value of 100% in mass distribution with a particle size with a diameter of about 1000 μm: i.e. all particles (100%) are smaller than 1000 μm. A value of about 50% is reached with a particle size of 200 μm to 500 μm in diameter, therefore the sum of the mass of the particles with a smaller diameter here is as high as the sum of the mass of all particles with a larger diameter.

However, what is particularly striking is that all the curves have only one inflection point before the particle size upper limit at 1000 μm is reached.

Figure 3:
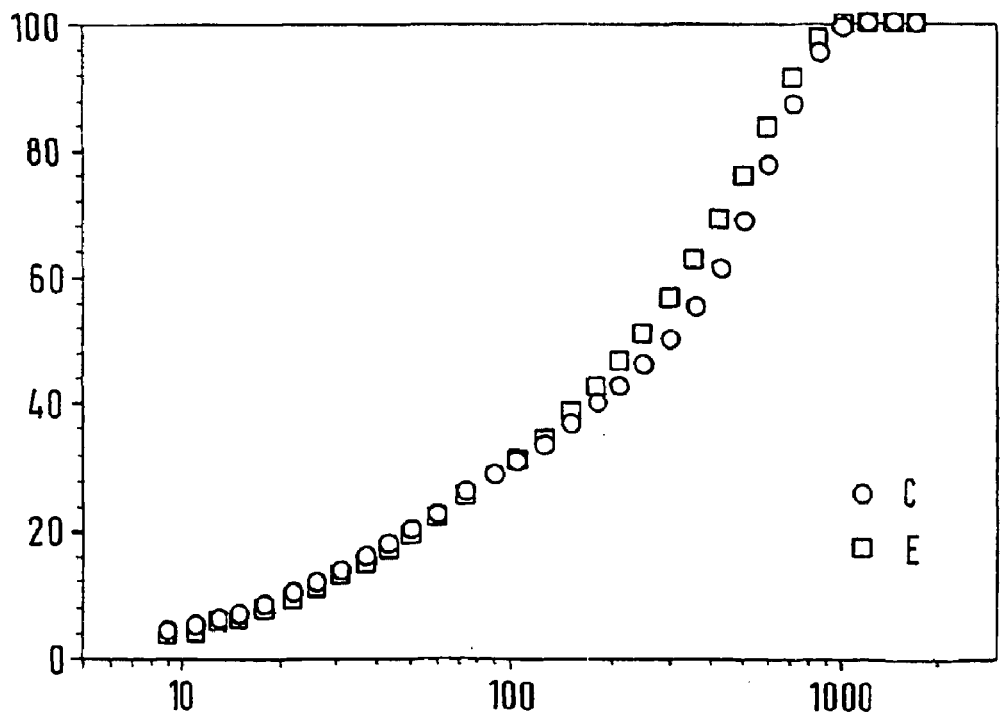
FIG. 3 shows the curve of the particle size distribution of ground, dried unmolassed sugar beet cossettes.

FIG. 3, otherwise with graduations identical to FIG. 2, shows the comparison with another distribution with two inflection points (curve C in relation to curve E), by way of example.

In FIG. 4 the ratio of the particle mass of the particles with a diameter below 100 μm ($F_{100}$) to the particle mass of particles with a diameter of between 100 μm and 400 μm ($F_{400-100}$) is entered to the right, and the gel breaking strength in pond (p) measured with a pectinometer directed upwards. The strength values shown in Table 1 and FIG. 4 of the gel formed with the material show that the firmness increases, as the particle size distribution broadens. The ratio of the particle mass below 100 μm to the particle mass between 100 and 400 μm can be seen as a magnitude for this breadth. The gel breaking strength of the material E is less than was to be expected according to the behaviour of materials A, B, C and D, since the additional inflection point in the particle size distribution has a negative effect.

The extent to which the deviation from a Gaussian normal distribution has a positive effect according to the invention is evident from FIG. 5. To the right the particle size is entered logarithmically as diameter in μm, and the integrated mass distribution in per cent (%) directed upwards. The mass cumulative distributions determined using the laser diffraction process shown therein of differently ground dried sugar beet cossettes were simulated mathematically by Gaussian distributions as a function of the particle size x $$G(x)=A\ \exp(-x^2/\sigma^2/2)$$

using a suitable program (e.g. SIGMA PLOT 2000, Version 6.0, SPSS Science). The parameters of the Gaussian distribution σ standard deviation $x_0$ mean particle size A scale factor were initially varied until the deviation between the calculated values and the differentiated cumulative distributions were minimal. Then with the start values thus obtained, the integrated form of the Gaussian distribution, the so-called error function, $$\text{erf} = B \int_0^x \exp(-u^2)\,du$$

was then calculated by numerical integration— approximately beginning at 0.01 μm—with $$u^2 = x^2/\sigma^2/2$$

and coordinated to the measured values, wherein $$1/B = \int_0^{x=2mm} \exp(-u^2)\,du$$

was calculated, again by numerical integration, to the dimension at which 100% by mass is reached, here 2000 μm. The data of curve 1 can also be reproduced by a Gaussian function with a mean particle diameter of 300 μm. In the case of curve 2 this is achieved only approximately with a negative mean particle diameter, which is physically nonsensical. The clumping properties of the cat litter produced from ground material (1) by extrusion were inadequate, whereas the litter produced under the same conditions from ground material (2) had excellent clumping capacity.

Table 1 shows the effect of the breadth of the particle size distribution on the gel breaking strength of the end product.

Working from dried beet material for A to E or 1 and 2, the respective ground material was mixed with 1% carboxymethyl cellulose (type WALOCEL CRT 30000 P, WOLFF CELLULOSICS GmbH), and then conditioned with 12 parts water and 2.5 parts steam to 100 parts ground material, and compacted in a dual-shaft extruder with a specific energy input of 80 to 100 kWh/kg, a head temperature of 215° C. and a final pressure of 85 to 90 bar, dried to approximately 12% final moisture content and crushed to the same mean particle size of 0.5 mm to 1.2 mm.

TABLE 1

| Test | Distribution Breadth $F_{100}/F_{400-100}$ | Gel Breaking Strength Tear-off force [p] | Gaussian Distribution Mean $x_0$ | Standard deviation $\sigma$ |
|---|---|---|---|---|
| A | 0.434 | 671 | | |
| B | 0.516 | 942 | | |
| C | 0.724 | 1497 | | |
| D | 0.837 | 2160 | | |
| E | 1.02 | 1506 | | |
| 1 | 0.292 | 790 | 300 | 360 |
| 2 | 0.810 | 2400 | −1000 | 600 |

What is claimed is:

1. A litter for cats and small animals, the litter comprising:
   a mixture of dried material of plant origin and an auxiliary agent to promote clumping of the mixture upon addition of moisture;
   wherein the dried material of plant origin is present in a particle size range in which diameters of about 80% of the particles by mass amount to between more than about 0 $\mu$m and less than about 1000 $\mu$m;
   wherein a mass cumulative distribution of the particle size distribution is at least in the range of between about 50 $\mu$m and 1000 $\mu$m greater than an integrated statistical Gaussian distribution,
   wherein the Gaussian distribution is a Gaussian normal distribution with a mean of about 100 $\mu$m and a standard deviation of about 800 $\mu$m, and
   wherein the particle size distribution deviates from this statistical Gaussian distribution by more than about 10%.

2. The litter according to claim 1, wherein
   the dried material of plant origin lies in a particle size range in which 90% of the particles by mass have a diameter of more than about 0 $\mu$m and less than about 1000 $\mu$m diameter, preferably of less than about 600 $\mu$m, in particular less than about 400 $\mu$m.

3. The litter according to claim 1 wherein the particle size distribution within the particle size range is such that the mass of the particles with a particle size in a lower third of the range amounts to more than 20% of the total mass of the particles.

4. The litter according to claim 1, wherein the particle size distribution is such that the ratio of the proportion by mass of particles of less than 100 $\mu$m to the proportion by mass of particles with a diameter of between 100 $\mu$m and 400 $\mu$m amounts to at least two to three and preferably less than seven to three.

5. The litter according to claim 1, wherein the mass cumulative distribution with an accuracy of about ±30% represents a monotonically rising function with only one inflection point before the maximum particle size.

6. The litter according to claim 5, further comprising an odour-adsorbing substance for the inherent odour of the sugar beet cossettes.

7. The litter according to claim 6, wherein the absorbent substance is selected from the group comprising cyclodextrin, in particular β-cyclodextrin, salts of transition metal ions and aluminium salts.

8. The litter according to claim 6, wherein the odor-absorbent substance includes flour in a proportion of up to 20% in total.

9. The litter according to claim 1, wherein a polydisperse uniform distribution is present within the particle size range, wherein within the range between a particle size of about 40 $\mu$m and a particle size of about 400 $\mu$m the relative proportion fluctuates by not more than about ±30%.

10. The litter according to claim 1, wherein the dried material of plant origin is selected from the group consisting of sugar beet cossettes and pulped chicory roots and citrus pellets.

11. The litter according to claim 1, wherein the auxiliary agent promoting clumping is a water-soluble polymer.

12. The litter according to claim 11, wherein the water-soluble polymer is a substance or a mixture of several substances selected from the group comprising cellulose derivative, galacto-mannan, starch, starch derivatives, polyacrylic acid, polyacrylamide or copolymers composed of acrylic acid and acrylamide as well as salts of the polyacrylic acid or the copolymers.

13. The litter according to claim 12, wherein the water-soluble polymer is a cellulose derivative selected from the group comprising is carboxymethyl cellulose, methyl cellulose, hydroxyethylmethyl cellulose or hydroxypropylmethyl cellulose.

14. The litter according to claim 12, wherein the water-soluble polymer is a cellulose derivative which is contained in a maximum proportion of 10%.

15. The litter according to claim 12, wherein the polymer is a chemical, which as a 2.5% aqueous solution has a viscosity of more than about 50 mPa.

16. The litter according to claim 12, wherein the water-soluble polymer is a galacto-mannan, and wherein the galacto-mannan is guar meal.

17. The litter according to claim 16, wherein the water-soluble polymer is a galacto-mannan which is contained in a maximum proportion of about 5%.

18. The litter according to claim 12, wherein the water-soluble polymer is a starch or starch derivative which is soluble in cold water.

19. The litter according to claim 18, wherein the water-soluble polymer is a starch which is selected from the group consisting of potato starch, tapioca starch and corn starch, or a mixture of these starches.

20. The litter according to claim 18, wherein the water-soluble polymer is a starch which is contained in a maximum concentration of 20%.

21. The litter according to claim 18, wherein the water-soluble polymer is a starch derivative, and wherein the starch derivative is carboxymethyl starch.

22. The litter according to claim 1, further comprising odor-adsorbing, inorganic additions, in particular porous inorganic additions such as bentonite and/or zeolite and/or diatomaceous earth, in a proportion of up to about 20% of the total mixture.

23. The litter according to claim 22, wherein the zeolite is a natural zeolite of the type clinoptilolite.

24. The litter according to claim 22, wherein the bentonite is a bentonite with a high proportion of montmorillonite, in particular mont-morillonite in the form exchanged with aliphatic amines or with alkali ions, in particular in $Na^+$ form or in $H^+$ form, is present as addition.

25. The litter according to claim 24, wherein the bentonite is an activated bentonite with a BET surface of more than 100 $m^2/g$ is used.

26. The litter according to claim 1, wherein the mixture further comprises a substance suitable for subsequent adjustment of the pH value after wetting.

27. The litter according to claim 26, wherein the substance comprises salt for adjustment of a pH value between about 4 and about 8.

28. The litter according to claim 26, wherein a solid dry pigment suitable for lightening the colour is added to the dry mixture of ground material of plant origin and the auxiliary agent promoting clumping, preferably to less than 20%.

29. The process for the production of litter according to claim 1, wherein dried material of plant origin is crushed in a mill and subsequently sieved, that the coarse fraction formed is returned to the grinding process again, that an auxiliary agent promoting clumping of the mixture on the addition of moisture is added, and that the resulting mixture is compacted and mechanically crushed.

30. The process for the production of litter according to claim 29, wherein the dry mixture is wetted with water and steam before compacting and after compacting is dried in a cooler and a dryer to the equilibrium moisture content.

31. The process for the production of litter according to claim 30, wherein the pH value of the added water is raised to values of up to about 9.

32. The process for the production of litter according to claim 1, wherein dried material of plant origin is crushed in a mill and subsequently sieved, that the coarse fraction formed is returned to the grinding process again, that an auxiliary agent promoting clumping of the mixture on the addition of moisture is added, and that the resulting mixture is wetted in a mixing machine, is agglomerated to the desired size therein and is then dried to the equilibrium moisture content.

33. The process for the production of litter according to claim 32, wherein samples of the dried material of plant origin are removed continuously or in batches prior to the addition of the auxiliary agent promoting clumping and their particle size distribution determined, preferably using the laser diffraction method.

* * * * *